US010823033B2

(12) United States Patent
Henzler et al.

(10) Patent No.: US 10,823,033 B2
(45) Date of Patent: Nov. 3, 2020

(54) EXHAUST GAS TREATMENT DEVICE

(71) Applicant: Eberspächer Exhaust Technology GmbH & Co. KG, Neunkirchen (DE)

(72) Inventors: Markus Henzler, Grafenberg (DE);
Michael Mayer, Bempflingen (DE);
Olexander Vyelyayev, Stuttgart (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 16/536,581

(22) Filed: Aug. 9, 2019

(65) Prior Publication Data

US 2020/0049051 A1    Feb. 13, 2020

(30) Foreign Application Priority Data

Aug. 13, 2018    (DE) .......................... 10 2018 119 592

(51) Int. Cl.
*F01N 3/20*    (2006.01)
*F01N 3/10*    (2006.01)
*F01N 3/28*    (2006.01)

(52) U.S. Cl.
CPC .......... *F01N 3/2073* (2013.01); *F01N 3/106* (2013.01); *F01N 3/208* (2013.01); *F01N 3/2803* (2013.01); *F01N 2900/1806* (2013.01)

(58) Field of Classification Search
None
See application file for complete search history.

(56) References Cited

U.S. PATENT DOCUMENTS

2013/0098002 A1* 4/2013 Danckert .............. F01N 3/2892
60/282
2013/0276438 A1* 10/2013 De Rudder ............... F01N 3/00
60/324

FOREIGN PATENT DOCUMENTS

| DE | 102015002224 A1 | 8/2016 |
| DE | 10 2017 101923 A1 | 8/2018 |
| EP | 2873821 A1 | 5/2015 |
| EP | 3 346 103 A1 | 7/2018 |
| WO | 2011/154254 A1 | 12/2011 |

* cited by examiner

*Primary Examiner* — Jelitza M Perez
(74) *Attorney, Agent, or Firm* — McGlew and Tuttle, P.C.

(57) ABSTRACT

An internal combustion engine, exhaust system, exhaust gas treatment device includes an housing (18) including a housing inlet (34) and a housing outlet (60). An exhaust gas treatment unit (28), in the housing, includes an inlet (32) following the housing inlet and an outlet (38). An SCR catalytic converter device (30), in the housing, includes an SCR catalytic converter device inlet (54) following the exhaust gas treatment unit outlet and an SCR catalytic converter device outlet (56). A reactant releasing device (52) releases reactant upstream of the SCR catalytic converter device inlet. An exhaust gas duct (42), formed in an exhaust gas pipe (44), leads in the housing from the exhaust gas treatment unit outlet to the SCR catalytic converter device inlet, whereby exhaust gas leaving the SCR catalytic converter device at the SCR catalytic converter device outlet flows around the exhaust gas pipe in at least some areas.

15 Claims, 1 Drawing Sheet

EXHAUST GAS TREATMENT DEVICE

CROSS REFERENCE TO RELATED APPLICATIONS

This application claims the benefit of priority under 35 U.S.C. § 119 of German Application 10 2018 119 592.3, filed Aug. 13, 2018, the entire contents of which are incorporated herein by reference.

TECHNICAL FIELD

The present invention pertains to an exhaust gas treatment device, which can be used in an exhaust system in a vehicle to purify the exhaust gas discharged by an internal combustion engine.

TECHNICAL BACKGROUND

To provide a compact configuration of exhaust systems, it is known that a plurality of system areas subjecting the exhaust gas to different purification procedures can be provided in such exhaust gas treatment devices. Such a system area comprises an SCR catalytic converter device, in which the percentage of nitrogen oxide in the exhaust gas is reduced by a catalytic reaction of exhaust gas and reactant injected into this, for example, a urea/water solution. Another such system area may comprise, for example, an oxidation catalytic converter device or/and a particle filter device.

SUMMARY

An object of the present invention is to provide an exhaust gas treatment device, which has a compact configuration and achieves efficient purification of exhaust gas flowing though same, for an exhaust system of an internal combustion engine.

This object is accomplished according to the present invention by an exhaust gas treatment device for an exhaust system of an internal combustion engine, comprising:
- an exhaust gas treatment housing with a housing inlet and with a housing outlet,
- an exhaust gas treatment unit in the exhaust gas treatment housing with an exhaust gas treatment unit inlet following the housing inlet and with an exhaust gas treatment unit outlet,
- an SCR catalytic converter device in the exhaust gas treatment housing with an SCR catalytic converter device inlet following the exhaust gas treatment unit outlet and with an SCR catalytic converter device outlet, and
- a reactant releasing device for releasing reactant upstream of the SCR catalytic converter device inlet,
- wherein an exhaust gas duct formed in an exhaust gas pipe in the exhaust gas treatment housing leads from the exhaust gas treatment unit outlet to the SCR catalytic converter inlet such that exhaust gas leaving the SCR catalytic converter device at the SCR catalytic converter device outlet flows around the exhaust gas pipe in at least some areas.

The heat of the exhaust gas stream leaving the SCR catalytic converter device is used in case of an exhaust gas treatment device configured according to the present invention to transfer heat to the exhaust gas pipe and thus to the mixture flowing therein by thermal interaction of said exhaust gas stream with said exhaust gas pipe carrying the mixture of exhaust gas and reactant to the SCR catalytic converter device. This supports the evaporation of the reactant being carried in the exhaust gas and impacting on the inner surface of the exhaust gas pipe, which leads to an improved and more uniform mixing of the exhaust gas with the reactant and thus to a more efficient reaction in the SCR catalytic converter device with minimized heat loss.

In order to provide, in spite of the compact configuration of the exhaust gas treatment device according to the present invention, the longest possible flow section, over which mixing of exhaust gas and reactant can be brought about, it is proposed that the reactant releasing device for releasing reactant be arranged in the area of the exhaust gas treatment unit outlet.

Provisions may be made for this purpose, for example, for the exhaust gas treatment unit outlet to comprise a first flow deflection housing, and for the reactant releasing device to be arranged in the area of the first flow deflection housing.

In order to make it possible to use essentially the entire length of the exhaust gas pipe for mixing exhaust gas and reactant, an upstream end area of the exhaust gas pipe may be arranged for receiving exhaust gas leaving the first flow deflection housing, and the reactant releasing device may be arranged for releasing reactant in the direction of the upstream end area of the exhaust gas pipe.

For an efficient utilization of the volume available in the exhaust gas treatment housing with the greatest possible thermal interaction of the exhaust gas pipe with exhaust gas flowing around it, it is proposed that the exhaust gas pipe be led in the exhaust gas treatment housing with a first pipe area from the exhaust gas treatment unit outlet laterally next to the SCR catalytic converter device in relation to a housing longitudinal axis and with a second pipe area essentially at right angles to the housing longitudinal axis along the SCR catalytic converter device outlet, and with a third pipe area laterally next to the SCR catalytic converter device in relation to the housing longitudinal axis to the SCR catalytic converter device inlet.

To introduce the mixture of exhaust gas and reactant into the SCR catalytic converter device, the SCR catalytic converter device inlet may comprise a second flow deflection housing. The third pipe area may now lead to the second flow deflection housing.

In order to make it possible for the exhaust gas leaving the SCR catalytic converter device to flow around the exhaust gas pipe led in the exhaust gas treatment housing in a simpler manner, it is proposed that the SCR catalytic converter device outlet be open towards a housing interior of the exhaust gas treatment housing. Further, the housing outlet may comprise an outlet opening, which is open towards the housing interior.

For a more extensive, efficient exhaust gas purification, provisions may be made, for example, for the exhaust gas treatment unit to comprise a catalytic converter device, preferably an oxidation catalytic converter device, or/and a particle filter device.

The present invention further pertains to an exhaust system for an internal combustion engine of a vehicle, comprising an exhaust gas treatment device configured according to the present invention.

The present invention will be described in detail below with reference to the attached figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
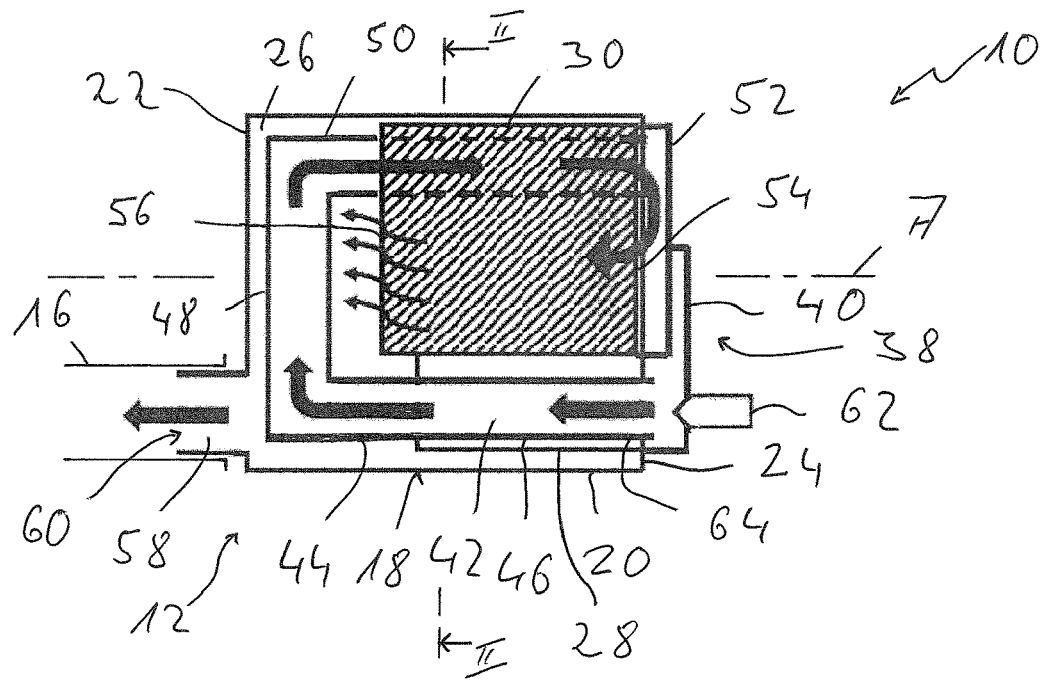
FIG. 1 is a schematic longitudinal sectional view of an exhaust gas treatment device.
Figure 2:
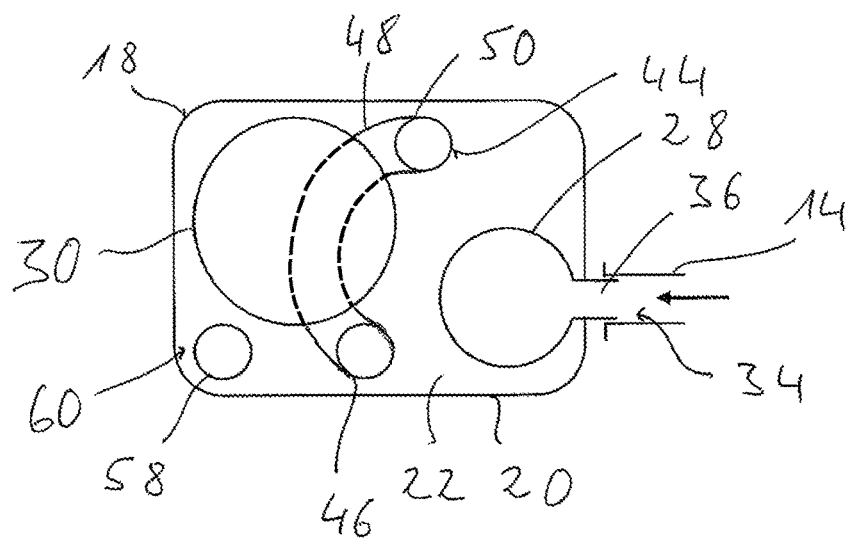
FIG. 2 is a schematic axial sectional view of the exhaust gas treatment device according to FIG. 1, taken along the line II-II of FIG. 1 and showing a portion of a second pipe area behind a catalytic converter device in dash line.

Referring to the drawings, FIGS. 1 and 2 show an exhaust gas treatment device 10 of an exhaust system of an internal combustion engine of a vehicle, which exhaust system is generally designated by 12. The exhaust system 12 comprises an exhaust gas pipe 14 leading, for example, from an exhaust manifold of an internal combustion engine to the exhaust gas treatment device 10 as well as an exhaust gas pipe 16 leading from the exhaust gas treatment device 10 to, for example, a muffler.

The exhaust gas treatment device 10 comprises an exhaust gas treatment housing generally designated by 18 with a circumferential wall 20 extending in the direction of the housing axis A and a front wall 22 and 24 each on the two axial sides thereof.

An exhaust gas treatment unit 28 and an SCR (Selective Catalytic Reduction) catalytic converter device 30 are provided following one another in the exhaust gas flow direction in a housing interior 26 of the exhaust gas treatment housing 18. The exhaust gas treatment unit 28 may comprise, for example, an oxidation catalytic converter device, especially a diesel oxidation catalytic converter device, as well as a particle filter device. An exhaust gas treatment unit inlet 32 is open towards a housing inlet 34 of the exhaust gas treatment housing 18. The exhaust gas sent via the exhaust gas pipe 14 to the housing inlet 34 flows over an inlet opening 36 formed in the area of the housing inlet 34, for example, in the circumferential wall 20, into the exhaust gas treatment unit inlet 32 and flows through the exhaust gas treatment unit 28, for example, essentially in the direction of the housing axis A.

The exhaust gas leaves the exhaust gas treatment unit 28 at an exhaust gas treatment unit outlet 38 provided in the area of the front wall 24. The exhaust gas treatment unit outlet 38 may comprise, for example, a first flow deflection housing 40, which is attached on the outside to the front wall 24 and in which the exhaust gas leaving the exhaust gas treatment unit 28 with a flow direction oriented essentially in the direction of the housing axis A is deflected at first in the radial direction in relation to the housing axis A and is then deflected again, so that the exhaust gas stream undergoes a deflection by about 180° in the area of the first flow deflection housing.

An exhaust gas pipe 44 providing an exhaust gas duct 42 is arranged in the housing interior 26. This exhaust gas pipe adjoins the first flow deflection housing 40 in the area of the front wall 24 with a first pipe area 46. The first pipe area 46 leads, laterally next to the SCR catalytic converter device 30 and also laterally next to the exhaust gas treatment unit 28, for example, extending essentially in the direction of the housing axis, along the SCR catalytic converter device 30. The first pipe area 46 is adjoined by a second pipe area 48, with which the exhaust gas pipe 44 crosses the SCR catalytic converter device 30 essentially at right angles to the housing axis A. The second pipe area 48 is then adjoined by a third pipe area 50, which, extending, for example, likewise essentially in the direction of the housing axis A, leads along the SCR catalytic converter device 30 in the direction of the front wall 24. A second flow deflection housing 52 is provided in the area of the front wall 24. Into this opens the third pipe area 50. The exhaust gas stream leaving the third pipe area 50 is deflected in the second flow deflection housing 52 first in the radial direction and then again in the axial direction, so that the exhaust gas stream undergoes a deflection by about 180° in the second flow deflection housing 52 as well.

The exhaust gas stream again leaving the second flow deflection housing 52 enters into the SCR catalytic converter device 30 in an SCR catalytic converter device inlet 54, flows through this device essentially in the direction of the housing axis A and leaves the SCR catalytic converter device 30 in the area of an SCR catalytic converter outlet 56. At this SCR catalytic converter device outlet 56, the exhaust gas leaving the SCR catalytic converter device 30 enters into the housing interior 26 and flows around at least the second pipe area 48 of the exhaust gas pipe 44, which pipe area extends essentially at right angles to the housing axis A and in the process crosses the SCR catalytic converter device 30. The exhaust gas stream leaving the SCR catalytic converter device 30 may also flow around other sections of the exhaust gas pipe 44, especially of the first pipe area 46 and of the third pipe area 50, before the exhaust gas stream leaves the housing interior 26 through an outlet opening 58 of a housing outlet 60 of the exhaust gas treatment device 18 in the direction of the exhaust gas pipe 16.

The reducing agent necessary for the catalytic reaction taking place in the SCR catalytic converter device 30, i.e., for example, a urea/water solution used as a reactant, is introduced into the exhaust gas stream flowing through the exhaust gas treatment device 10 by a reactant releasing device 62, which is generally also called an injector. The reactant releasing device 62 is preferably arranged downstream of the exhaust gas treatment unit 28 and is positioned for releasing reactant into the exhaust gas stream downstream of the exhaust gas treatment unit 28. The reactant releasing device 62 may be positioned, for example, in the area of the first flow deflection housing 40 in order to introduce the reactant being released by same into an upstream end area 64 of the exhaust gas pipe 44 or of the first pipe area 46 thereof. This guarantees the longest possible flow section between the introduction of the reactant into the exhaust gas stream and the introduction of the exhaust gas stream mixed with reactant into the SCR catalytic converter device 30. As is shown in FIGS. 1 and 2, essentially the total length of the exhaust gas pipe 44 extending in the interior 27 can be used to bring about the mixing of exhaust gas and reactant. The mixing of exhaust gas and reactant is also supported by the deflection of the exhaust gas stream in the area of the second flow deflection housing 52 and by the swirling developing in the process.

This mixing is supported, furthermore, by the exhaust gas leaving the SCR catalytic converter device 30 after the exothermal catalytic reaction has been carried out flowing around a substantial length section of the exhaust gas pipe 44. Heat being transported in the exhaust gas can now be transferred to the exhaust gas pipe 44, so that this and hence the mixture of exhaust gas and reactant flowing in the exhaust gas duct 42 are heated. This supports the evaporation of the reactant being carried in the exhaust gas in the form of droplets and it additionally supports the evaporation of the reactant impacting the inner surface of the exhaust gas pipe 44 in the form of droplets. It is especially advantageous in this connection that, according to the principles of the present invention, the exhaust gas pipe 44 extends with its second pipe area 48 such that it covers in some areas the area of the SCR catalytic converter device 30, in which exhaust gas flowing through it is discharged. A direct thermal interaction is brought about in this area between the exhaust gas stream and the exhaust gas pipe 44 and hence and an efficient transfer of heat to this exhaust gas pipe is thus brought about.

The fact that the second pipe area 48, which connects the first pipe area 46 to the third pipe area 50 and which extends essentially at right angles to the housing axis A, is curved and thus provides an increased overlap with the SCR catalytic converter device outlet 56, contributes to this efficient thermal interaction. It should be noted that other courses may also be provided, especially for the second pipe area 48. Thus, this pipe area 48 may be configured such that it extends in an essentially U-shaped pattern over the SCR catalytic converter device outlet 56 or it may provide a meandering or undulating structure. The first pipe area 46 or/and the third pipe area 50 may also be configured, deviating from the essentially straight course shown, extending in the direction of the housing axis A, for example, with a curved, undulating or meandering course, in order to improve, on the one hand, the thermal interaction with the exhaust gas flowing in the housing interior 26, and, on the other hand, to increase the length of the exhaust gas duct 42 formed in the exhaust gas pipe 44, which length can be utilized for mixing exhaust gas and reactant.

While specific embodiments of the invention have been shown and described in detail to illustrate the application of the principles of the invention, it will be understood that the invention may be embodied otherwise without departing from such principles.

What is claimed is:

1. An exhaust gas treatment device for an exhaust system of an internal combustion engine, exhaust gas treatment device comprising:
    an exhaust gas treatment housing with a housing inlet and with a housing outlet; an exhaust gas treatment unit in the exhaust gas treatment housing with an exhaust gas treatment unit inlet following the housing inlet and with an exhaust gas treatment unit outlet;
    an SCR catalytic converter device in the exhaust gas treatment housing with an SCR catalytic converter device inlet following the exhaust gas treatment unit outlet and with an SCR catalytic converter device outlet;
    a reactant releasing device for releasing reactant upstream of the SCR catalytic converter device inlet; and
    an exhaust gas duct formed in an exhaust gas pipe, the exhaust gas duct leading in the exhaust gas treatment housing to the SCR catalytic converter device inlet such that exhaust gas leaving the SCR catalytic converter device at the SCR catalytic converter device outlet flows around the exhaust gas pipe in at least some areas, the reactant releasing device being arranged for releasing reactant in an area of the exhaust gas treatment unit outlet, the exhaust gas treatment unit outlet comprising a first flow deflection housing, the reactant releasing device being arranged in an area of the first flow deflection housing, the exhaust gas pipe having an upstream end area arranged for receiving exhaust gas leaving the first flow deflection housing, the reactant releasing device being arranged for releasing reactant in a direction of the upstream end area of the exhaust gas pipe, wherein the exhaust gas pipe in the exhaust gas treatment housing comprises:
    a first pipe area positioned laterally next to the SCR catalytic converter device in relation to a housing longitudinal axis and leading from the exhaust gas treatment unit outlet;
    a second pipe area essentially at right angles to the housing longitudinal axis along a length of the SCR catalytic converter device outlet; and
    a third pipe area laterally next to the SCR catalytic converter device in relation to the housing longitudinal axis and leading to the SCR catalytic converter device inlet.

2. An exhaust gas treatment device in accordance with claim 1, wherein:
    the SCR catalytic converter device inlet comprises a second flow deflection housing; and
    the third pipe area leads to the second flow deflection housing.

3. An exhaust gas treatment device in accordance with claim 1, wherein the SCR catalytic converter device inlet comprises a second flow deflection housing.

4. An exhaust gas treatment device in accordance with claim 1, wherein:
    the SCR catalytic converter device outlet is open towards a housing interior of the exhaust gas treatment housing; or
    the housing outlet comprises an outlet opening that is open towards a housing interior; or
    the SCR catalytic converter device outlet is open towards a housing interior of the exhaust gas treatment housing and the housing outlet comprises an outlet opening that is open towards the housing interior.

5. An exhaust gas treatment device in accordance with claim 1, wherein the exhaust gas treatment unit comprises:
    a catalytic converter device; or
    a particle filter device; or
    a catalytic converter device and a particle filter device.

6. An exhaust system for an internal combustion engine of a vehicle, comprising an exhaust gas treatment device, the exhaust gas treatment device comprising:
    an exhaust gas treatment housing with a housing inlet and with a housing outlet;
    an exhaust gas treatment unit in the exhaust gas treatment housing with an exhaust gas treatment unit inlet following the housing inlet and with an exhaust gas treatment unit outlet;
    an SCR catalytic converter device in the exhaust gas treatment housing with an SCR catalytic converter device inlet following the exhaust gas treatment unit outlet and with an SCR catalytic converter device outlet;
    a reactant releasing device for releasing reactant upstream of the SCR catalytic converter device inlet; and
    an exhaust gas duct formed in an exhaust gas pipe, the exhaust gas duct leading in the exhaust gas treatment housing to the SCR catalytic converter device inlet such that exhaust gas leaving the SCR catalytic converter device at the SCR catalytic converter device outlet flows around the exhaust gas pipe in at least some areas, the reactant releasing device being arranged for releasing reactant in an area of the exhaust gas treatment unit outlet, the exhaust gas treatment unit outlet comprising a first flow deflection housing, the reactant releasing device being arranged in an area of the first flow deflection housing, the exhaust gas pipe having an upstream end area arranged for receiving exhaust gas leaving the first flow deflection housing, the reactant releasing device being arranged for releasing reactant in a direction of the upstream end area of the exhaust gas pipe, wherein the exhaust gas pipe in the exhaust gas treatment housing comprises:
a first pipe area positioned laterally next to the SCR catalytic converter device in relation to a housing longitudinal axis and leading from the exhaust gas treatment unit outlet;
a second pipe area essentially at right angles to the housing longitudinal axis along a length of the SCR catalytic converter device outlet; and
a third pipe area laterally next to the SCR catalytic converter device in relation to the housing longitudinal axis and leading to the SCR catalytic converter device inlet.

7. An exhaust system in accordance with claim 6, wherein:
the SCR catalytic converter device inlet comprises a second flow deflection housing; and
the third pipe area leads to the second flow deflection housing.

8. An exhaust system in accordance with claim 6, wherein the SCR catalytic converter device inlet comprises a second flow deflection housing.

9. An exhaust system in accordance with claim 6, wherein:
the SCR catalytic converter device outlet is open towards a housing interior of the exhaust gas treatment housing; or
the housing outlet comprises an outlet opening that is open towards a housing interior; or
the SCR catalytic converter device outlet is open towards a housing interior of the exhaust gas treatment housing and the housing outlet comprises an outlet opening that is open towards the housing interior.

10. An exhaust system in accordance with claim 6, wherein the exhaust gas treatment unit comprises:
a catalytic converter device; or
a particle filter device; or
a catalytic converter device and a particle filter device.

11. An exhaust gas treatment device for an exhaust system of an internal combustion engine, the exhaust gas treatment device comprising:
an exhaust gas treatment housing comprising a housing inlet and a housing outlet; an exhaust gas treatment unit in the exhaust gas treatment housing, the exhaust gas treatment unit comprising an exhaust gas treatment unit inlet following the housing inlet, the exhaust gas treatment unit further comprising an exhaust gas treatment unit outlet;
an SCR catalytic converter device in the exhaust gas treatment housing, the SCR catalytic converter device comprising an SCR catalytic converter device inlet following the exhaust gas treatment unit outlet, the SCR catalytic converter device further comprising an SCR catalytic converter device outlet and a SCR catalytic converter device outer peripheral surface;
a reactant releasing device for releasing reactant upstream of the SCR catalytic converter device inlet; and
an exhaust gas pipe comprising an exhaust gas duct extending in the exhaust gas treatment housing to the SCR catalytic converter device inlet such that exhaust gas leaving the SCR catalytic converter device at the SCR catalytic converter device outlet flows around the exhaust gas pipe in at least some areas, the reactant releasing device being arranged for releasing reactant in an area of the exhaust gas treatment unit outlet, the exhaust gas treatment unit outlet comprising a first flow deflection housing, the reactant releasing device being arranged in an area of the first flow deflection housing, the exhaust gas pipe having an upstream end area arranged for receiving exhaust gas leaving the first flow deflection housing, the reactant releasing device being arranged for releasing reactant in a direction of the upstream end area of the exhaust gas pipe, wherein the exhaust gas pipe in the exhaust gas treatment housing comprises:
a first pipe area positioned laterally adjacent to at least a portion of the SCR catalytic converter device outer peripheral surface in relation to a housing longitudinal axis, the first pipe area extending from the exhaust gas treatment unit outlet;
a second pipe area at right angles to the housing longitudinal axis along a length of the SCR catalytic converter device outlet; and
a third pipe area laterally adjacent to another portion of the SCR catalytic converter device outer peripheral surface in relation to the housing longitudinal axis, the third pipe area extending to the SCR catalytic converter device inlet.

12. An exhaust gas treatment device in accordance with claim 11, wherein:
the SCR catalytic converter device inlet comprises a second flow deflection housing; and
the third pipe area leads to the second flow deflection housing.

13. An exhaust gas treatment device in accordance with claim 11, wherein the SCR catalytic converter device inlet comprises a second flow deflection housing.

14. An exhaust gas treatment device in accordance with claim 11, wherein:
the SCR catalytic converter device outlet is open towards a housing interior of the exhaust gas treatment housing; or
the housing outlet comprises an outlet opening that is open towards a housing interior; or
the SCR catalytic converter device outlet is open towards a housing interior of the exhaust gas treatment housing and the housing outlet comprises an outlet opening that is open towards the housing interior.

15. An exhaust gas treatment device in accordance with claim 11, wherein the exhaust gas treatment unit comprises:
a catalytic converter device; or
a particle filter device; or
a catalytic converter device and a particle filter device.

* * * * *